United States Patent [19]
Bataille

[11] Patent Number: 5,531,299
[45] Date of Patent: Jul. 2, 1996

[54] ONE-PIECE OBTURATOR DEVICE WITH LUBRICATED CENTERING GUIDE FOR PRESSURIZED HYDRAULIC DAMPER TUBES

[75] Inventor: Alain Bataille, Paris, France

[73] Assignee: Societe Francaise Des Amortisseurs de Carbon, Du Vauvray, France

[21] Appl. No.: 283,626

[22] Filed: Aug. 1, 1994

[30] Foreign Application Priority Data

Aug. 6, 1993 [FR] France .................................. 93 09743
Apr. 6, 1994 [FR] France .................................. 94 04026

[51] Int. Cl.[6] ...................................................... F16F 9/36
[52] U.S. Cl. ................................. 188/322.17; 92/168
[58] Field of Search ............................. 92/165 R, 168;
188/264 B, 266, 297, 311–315, 322.16–322.18;
277/31, 33, 59, 74, 78, 79, 135, DIG. 8

[56] References Cited

U.S. PATENT DOCUMENTS

| | | | |
|---|---|---|---|
| 3,837,445 | 9/1974 | Pierle | 188/322 |
| 4,166,523 | 9/1979 | Fujii et al. | 188/322.17 |
| 4,287,970 | 9/1981 | Eusemann et al. | 188/269 |
| 4,360,192 | 11/1982 | Ishida | 277/59 X |
| 4,482,036 | 11/1984 | Wossner et al. | 188/322.17 X |
| 4,946,143 | 8/1990 | Bauer et al. | 188/322.17 X |
| 5,178,243 | 1/1993 | Hamada et al. | 277/33 X |

FOREIGN PATENT DOCUMENTS

| | | |
|---|---|---|
| 0059150A1 | 1/1982 | European Pat. Off. . |
| 0565832A1 | 10/1993 | European Pat. Off. . |
| 69148 | 10/1958 | France ............................. 188/322.17 |
| 1916487 | 10/1969 | Germany . |
| 2122966 | 11/1972 | Germany ........................ 188/322.17 |
| 2442731 | 3/1976 | Germany ................................ 92/168 |
| 7708863 | 7/1977 | Germany . |
| 2905928 | 8/1980 | Germany . |
| 3002700 | 7/1981 | Germany ........................ 188/322.17 |
| 709338 | 5/1954 | United Kingdom ............. 188/322.17 |
| 824964 | 12/1959 | United Kingdom ............. 188/322.17 |
| 2009866 | 6/1979 | United Kingdom . |

*Primary Examiner*—Lee Young
*Attorney, Agent, or Firm*—Beveridge, DeGrandi, Weilacher & Young

[57] ABSTRACT

An obturator device for a pressurized hydraulic damper tube of the single tube type in which slides a piston having an axial piston rod. The obturator device includes a plug, a seal, a fixing mechanism and a cylindrical guide whose central opening guides axial movement of the piston rod. The guide has a guide base and an axial peripheral wall defining a circular housing for supporting and centering the seal and the plug. The seal and plug can be fully received with the circular housing in one embodiment of the invention. The base has a plurality of perforations arranged along a circular path positioned at the bottom of an annular groove formed in the base's upper side. The plug has a central opening whose diameter is greater than the diameter of the piston rod of the tube to define a radial clearance preventing mechanical contact between the plug and the piston rod during operation of the damper. The plug also has a circular housing around its central opening to receive part of the seal sandwiched between the plug and guide device.

31 Claims, 6 Drawing Sheets

ONE-PIECE OBTURATOR DEVICE WITH LUBRICATED CENTERING GUIDE FOR PRESSURIZED HYDRAULIC DAMPER TUBES

FIELD OF THE INVENTION

The present invention concerns an obturator device for a pressurised hydraulic damper tube, and in particular one of the single-tube type.

BACKGROUND DISCUSSION

Hydraulic dampers are routinely fitted to vehicles, in particular automobile vehicles. A pressurised hydraulic damper usually comprises a piston adapted to slide inside a tube, defining two chambers one on each side of the piston and filled with a liquid. A passage through the piston provides communication between the two chambers, cooperating with a floating valve which regulates the aperture of the passage according to the direction of flow of the liquid in the passage. This flow is caused by axial movement of the piston in the tube during extension or compression of the damper. The piston is usually fixed to one end of a piston rod whose displacement within the tube is guided axially by an obturator device mounted at one end of the tube.

The obturator devices seal an end part of the damper tube and guide axial movement of the piston rod and thus of the piston inside the damper tube. An obturator device usually comprises a guide plug, at least one seal, an expansion abutment member and means for fixing all these components to the tube, the seal or seals being sandwiched between the guide plug and the expansion abutment member.

As its name indicates, the guide plug guides axial movement of the piston rod inside the damper tube. The seal provides a seal not only between the guide plug and the tube but also between the guide plug and the piston rod. As a result there is virtually no contact between the guide plug and the damper liquid, which is usually an incompressible oil. Consequently, guidance of the piston rod by the guide plug is not lubricated by the oil in the damper. Given that the guide plug and the piston rod are made of metal, friction is generated between these two components when the damper operates. This friction heats the piston rod and the guide plug, accelerating aging of the adjoining seal, and causes wear between the piston rod and the guide plug. Aging of the seal caused by heating significantly shortens the service life of the seal. Wear between the piston rod and the guide plug increases the radial clearance between these two components and thus reduces the accuracy with which axial movement of the piston in the damper tube is guided.

The radial clearance required between the piston rod and the guide plug and the absence of lubrication of the guide surfaces cause noise due to impact between the piston rod and the guide plug during operation of the damper. The loads on the damper are not strictly axial. The radial components of these loads cause mechanical impact between the piston rod and the guide plug followed by vibration of the piston rod and giving rise to a chirping noise due to interference between the piston rod and the guide plug if the amplitude of vibration of the piston rod is greater than or equal to the radial clearance between the piston and the guide plug. The noise caused in this way is unpleasant to the user.

The use of three stacked separate components (guide plug, seal(s) and expansion abutment member) means that assembly of the obturator device is relatively time-consuming, which increases the cost of the damper.

SUMMARY OF THE INVENTION

An object of the present invention is to solve all the problems mentioned above by proposing a simple and effective obturator device.

In accordance with the invention, a lubricated guide for the piston rod replaces the conventional expansion abutment member and also constitutes a centring support for the plug and the seal. This eliminates guidance of the piston rod by the plug, leaving sufficient radial clearance between the plug and the piston rod passing through it.

The obturator device in accordance with the invention is adapted to be mounted in a pressurised hydraulic damper tube in which slides a piston having an axial piston rod. The obturator device comprises a plug, at least one seal, an expansion abutment member and means for fixing all these components into the tube, the obturator device surrounding the piston rod of the damper near the upper end of the tube.

In accordance with the invention, the expansion abutment member constitutes a cylindrical slide with a guide base for axial guidance of the piston rod and an axial peripheral wall defining with the base a circular housing for centering the seal and the plug. The base has one or more perforations distributed over a circular path concentric with the piston rod. The perforations in the base provide permanent communication between the oil in the damper and an expansion volume for the oil between the seal centred in the housing and the guide base. The expansion volume can be defined by an annular groove on the top of the base, the bottom of the groove communicating with said perforations, or an annular groove on the seal facing the perforations in the base, or an inclined surface at the top of the base or the seal.

The plug has a circular central opening through which the piston rod passes with radial clearance. The seal is sandwiched between the plug and the guide base at the bottom of the circular housing. The expansion volume can be defined by two concentric axial bearing rings between the seal and the guide base.

The obturator device of the invention is made in one piece with the plug and the seal integral with the circular housing of the guide. This simplifies mounting of the device in the damper tube.

In one embodiment of the invention the lower part of the guide base of the obturator device is shaped to cooperate with a predetermined upper part of the piston as it slides, the guide base shaped accordingly and said predetermined upper part of the piston together forming a hydraulic abutment.

It is equally possible to provide an elastic auxiliary abutment member disposed between the predetermined upper part of the piston and the inside of the guide base.

BRIEF DESCRIPTION OF THE PREFERRED EMBODIMENTS

The invention will be better understood from the detailed description of a few embodiments of the invention given by way of non-limiting example and illustrated by the appended drawings, in which:

FIG. 1 is a diagrammatic axial cross-section of a conventional single-tube pressurised hydraulic damper, FIG. 2 shows part of FIG. 1 with the damper fitted with a first embodiment of the obturator device of the invention, FIG. 3 is a view similar to FIG. 2 showing a second embodiment of the invention, FIG. 4 is a view similar to FIG. 3 showing a third embodiment of the invention, FIG. 5 is a view similar to FIG. 2 showing a fourth embodiment of the invention, FIG. 6 is a view similar to FIG. 5 showing a fifth embodiment of the invention, FIG. 7 is a view similar to FIG. 5 showing a sixth embodiment of the invention, and FIGS. 8 through 11 show other embodiments of the invention providing a hydraulic abutment.

DETAILED DESCRIPTION OF THE PREFERRED EMBODIMENTS

Figure 1:
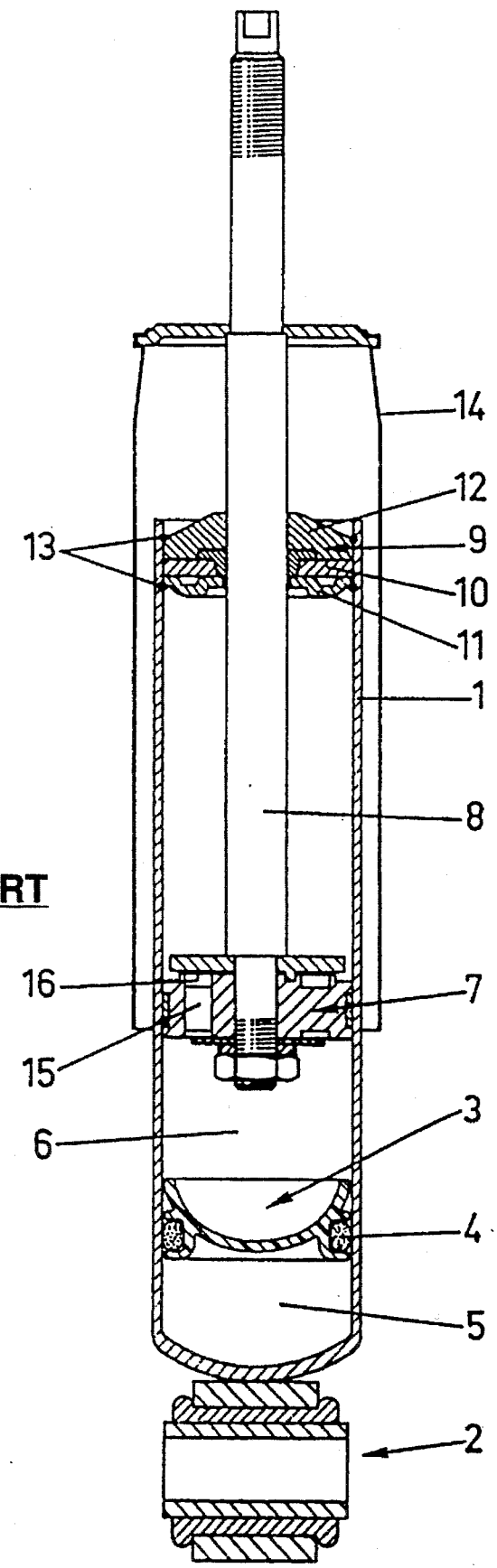
Figure 2:
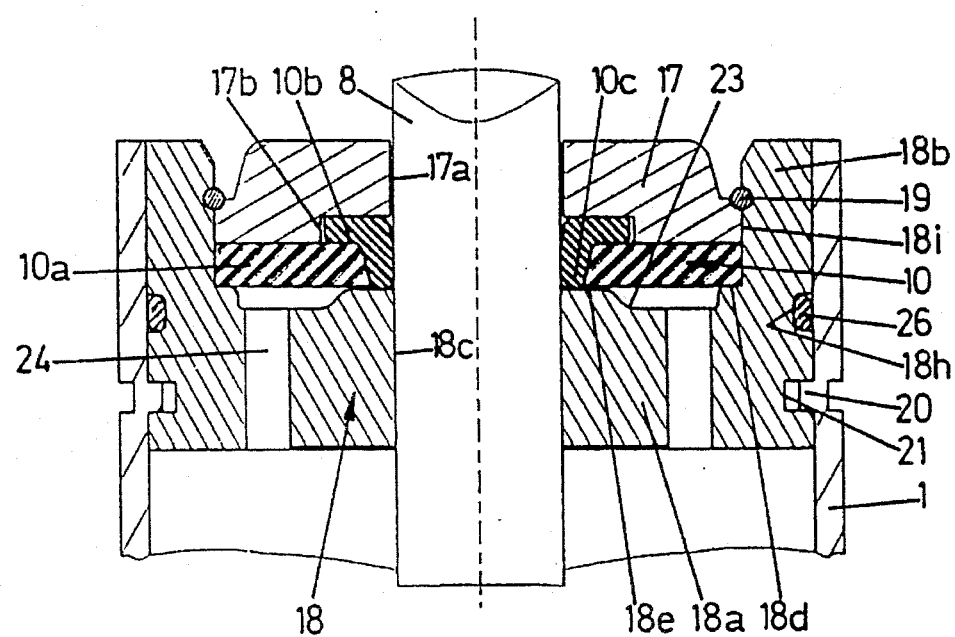

Referring to FIG. 1, the single-tube pressurised hydraulic damper comprises a tube 1 fixed at its lower end by a lug 2. A gas/liquid separator piston 3 mounted to slide freely in the lower part of the tube 1 has a seal 4 and separates the tube into two closed compartments. The lower compartment 5 contains a pressurised gas and the upper compartment 6 is filled with a liquid which is usually an incompressible oil. A second piston 7 is fixed to the lower end of a piston rod 8, displacement of which inside the tube 1 is guided by an obturator device 9 fixed to the upper part of the tube 1. The upper end of the piston rod 8 of the piston 7 is fastened to a fixing pin. The damper can be completed by a generally tubular protector 14 fastened to the upper part of the piston rod 8 and capping the top of the tube 1. To act as a damper the piston 7 has permanent passages 15 for the oil of the damper to pass through. These passages 15 cooperate with a floating valve 16 to define two active hydraulic chambers on respective opposite sides of the piston 7.

A conventional obturator device 9 comprises a seal 10, a expansion abutment member 11 made from a metal flange and a guide plug 12 against the inside of which the seal 10 is pressed by the oil pressure, being held in place by the expansion abutment member 11. The assembly is fixed to the inside of the tube 1 at the top of the latter by two circlips 13. Axial displacement of the piston rod 8 of the piston 7 is guided by the guide plug 12. The expansion abutment member 11 has a central opening through which the piston rod 8 passes with radial clearance and supports the seal 10. The seal 10 has two complementary parts: a static washer-like first part providing a seal between the guide plug 12 and the inside wall of the tube 1, and a dynamic second part fitting around the piston rod 8 by virtue of elastic deformation to provide a seal between the guide plug 12 and the piston rod 8 of the piston 7. The seal 10 is made from an elastomer material or two different elastomer materials.

Given that the seal 10 prevents the damper oil penetrating between the surfaces in contact with the guide plug 12 and the piston rod 8, there is virtually no lubrication of these contacting surfaces. Repeated operation of the damper then causes wear by friction of the surfaces of contact between the metal piston rod 8 and the guide plug 12, which is often made of metal. This friction can cause localised heating which damages the dynamic part of the elastomer seal 10. If the damper is subject to loads which are not strictly axial impacts occur between the guide plug 12 and the piston rod 8, which bends, and this can cause noise which is unpleasant for the driver of the vehicle to which the damper is fitted.

Figure 3:
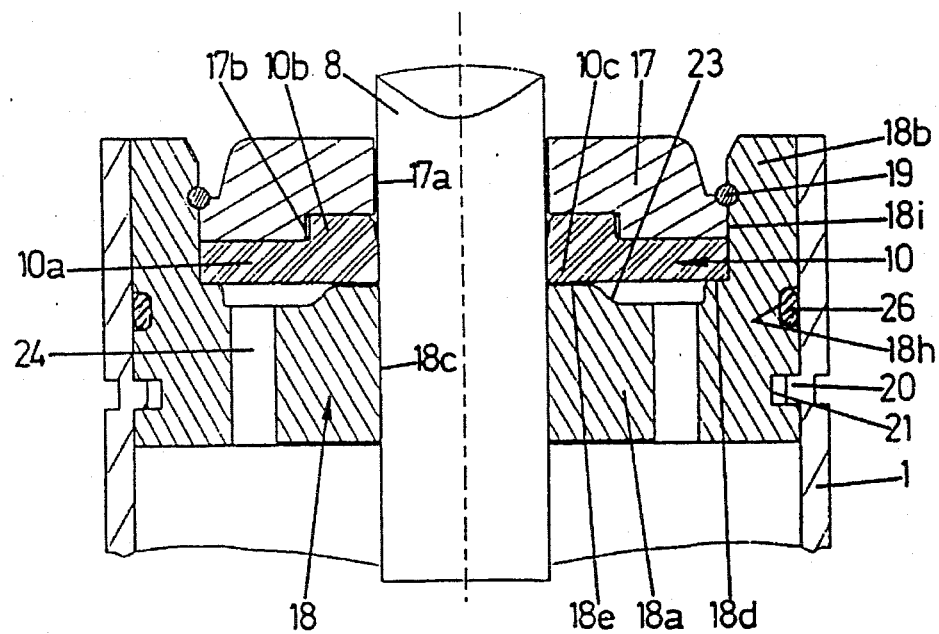
Figure 4:
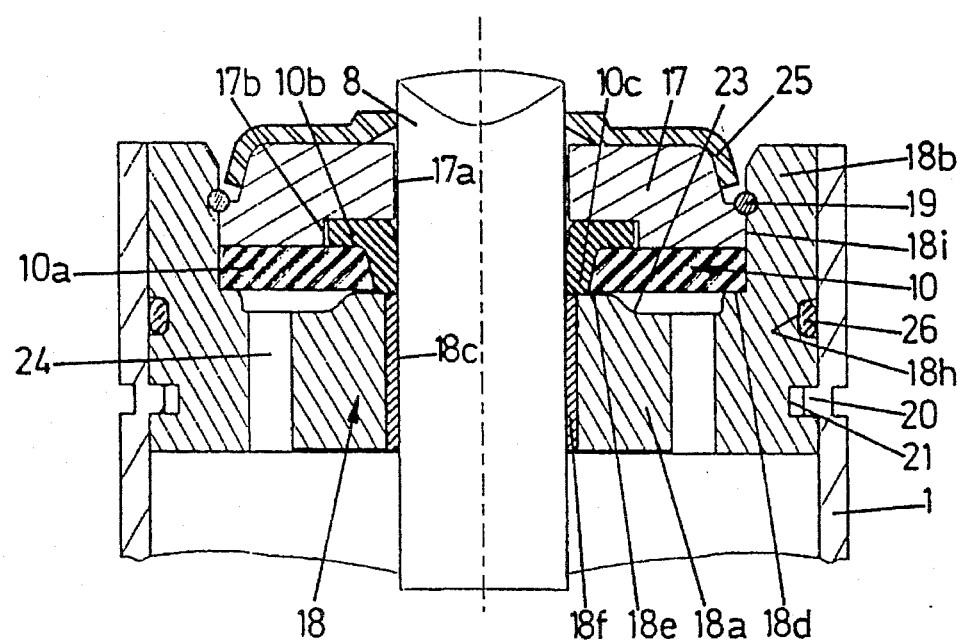
Figure 5:
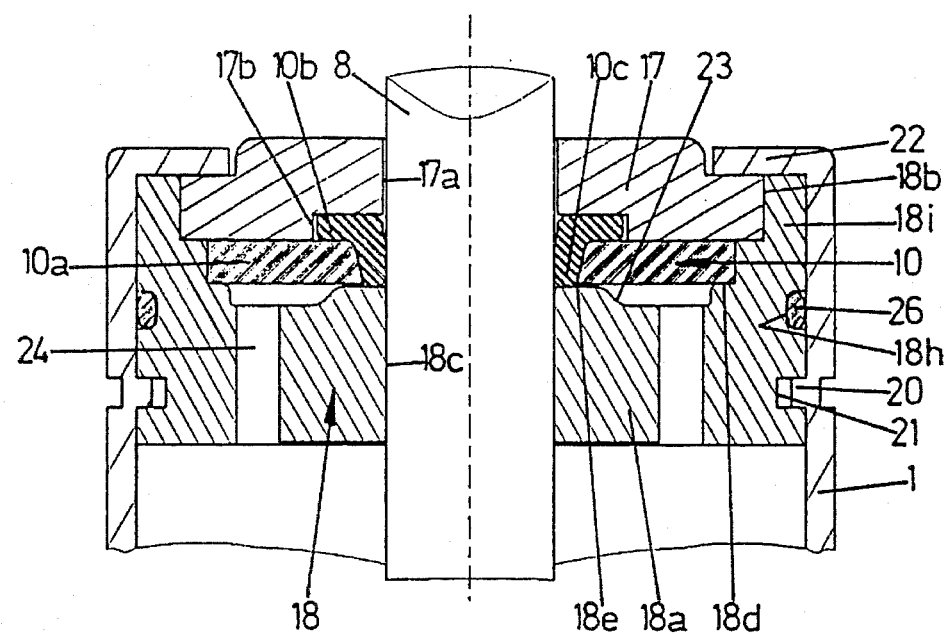

As shown in FIGS. 2 through 7 the obturator device of the invention comprises a seal 10 with two concentric parts assembled together: a static part 10a in the form of a washer and a dynamic part 10b which is also annular and centered relative to the static part 10a. The seal 10 can instead be in one piece (FIG. 3). The dynamic part 10b of the seal is forcibly radially expanded by the piston rod 8 of the piston 7 which passes through it and acts as an oil scraper around the piston rod 8. The outside edge of the static part 10a of the seal is in contact with an inside peripheral surface of a circular housing of a guide 18 described below.

The obturator device also includes an annular plug 17 whose outside diameter is substantially equal to or slightly less than the inside diameter of a peripheral surface of the circular housing in the guide 18 and the inside diameter of which is greater than the diameter of the piston rod 8, so that there is a radial clearance to prevent direct contact between the plug 17 and the piston rod 8 during operation of the damper.

The obturator device further comprises a cylindrical lubricated guide 18 with a base 18a whose outside diameter is substantially equal to the inside diameter of the damper tube 1 and whose inside diameter is very slightly greater than the diameter of the piston rod 8, so that it is able to guide axial movement of the piston. The guide base 18a is extended upwardly by an axial peripheral wall 18b whose cylindrical outside surface mates with the inside wall of the damper tube 1. The peripheral wall 18b defines with the guide base 18a a circular housing open at the top which receives and centers the seal 10 and the plug 17.

The seal 10 is sandwiched between the plug 17 and the guide base 18a around the piston rod 8 at the bottom of the circular housing of the guide 18 near the upper end of the damper tube 1. This assembly can be fixed into the tube 1 in the axial direction by means of a circlip 19 constituting an axial abutment for the plug 17 in the circular housing of the lubricated guide 18 and a radial contraction 20 of the tube 1 cooperating with a peripheral groove 21 on the lubricated guide 18 to constitute an axial abutment for the guide (see FIGS. 2 to 4) or by crimping the upper end of the tube 1 to the plug 17 at 22 and a radial contraction 20 of the tube 1 cooperating with a peripheral groove 21 on the lubricated guide 18 (or with the lower end of the guide with no such peripheral groove) to constitute an axial abutment for the lubricated guide 18 (see FIGS. 5 to 7).

As shown in FIGS. 2 to 5 a cylindrical lubricated guide 18 can have on the base 18a an annular groove 23 concentric with the central opening 18c providing an axial guide for the piston rod 8. The annular groove 23 has a substantially trapezoidal or V-shape cross-section widening towards its open side. At the bottom of the annular groove 23 one or more axial perforations 24 through the guide 18 are regularly distributed along the annular groove 23. The annular groove 23 thus defines an expansion volume for the oil between the seal 10 and the guide 18, this expansion volume communicating with the oil in the damper through the perforations 24.

In practice, the diameter of the central opening 18c of the lubricated guide 18 is greater than the diameter of the piston rod 8 by a few hundredths of a millimeter, preferably less than one tenth of a millimeter, to enable proper guidance of movement of the piston rod 8. This difference in diameter is sufficient to allow an oil film to remain at all times between the guide 18 and the piston rod 8, given that the guide 18 is entirely immersed in the oil in the damper and the guide surfaces between the guide 18 and the piston rod 8 are constantly supplied with oil by capillary action and by virtue of the axial movement of the piston rod 8 which draws oil into this guide space. The guide 18 is therefore lubricated at all times, which reduces wear between the piston rod 8 and the guide 18 and so increases the service life of these components. The oil film on the guide surfaces also reduces heating of the components, and especially of the guide 18 which is immersed in the oil and cooled thereby.

The seal 10 is made from an elastomer material. The static and dynamic parts 10a, 10b can have different chemical compositions. To enable deformation of the seal 10 around the piston rod 8, an annular housing 17b is provided on the bottom of the plug 17. The diameter of the central opening 17a of the plug 17 is greater than the diameter of the piston rod 8 by a few tenths of a millimeter, preferably less than one millimeter. Excessive radial clearance between the plug 17 and the piston rod 8 could allow excessive elastic deformation of the seal 10, which could cause oil to leak past the seal 10b around the piston rod 8, the oil pressure in the damper possibly being as much as 250 bars during operation of the damper.

The seal 10 is preferably mechanically sandwiched between the plug 17 and the guide base 18a by two concentric surfaces 18d and 18e of the base 18a separated radially by the annular groove 23 which defines the oil expansion volume between the seal 10 and the guide 18. The seal 10 is then exposed to the oil pressure over a great part of its lower surface, which allows good deformation of the seal assembly to provide the seal function. It is possible to increase the surface area of the seal 10 in permanent contact with the oil in the damper by recessing the inside annular surface 18e of the guide 18 relative to the outside annular surface 18d of the guide 18, said annular surfaces facing the lower surface of the seal 10. It is then advantageous to provide a ring 10c projecting axially from the lower surface of the seal 10 and bearing axially against the recessed inside annular surface 18e of the guide 18. In this way the seal 10 is better controlled by the oil in the damper. Variation in the oil pressure when the damper operates does not affect the lubricated guide 18 as both sides of the base 18a are exposed to the same hydraulic pressure because of the perforations 24.

It is important to provide an expansion volume for the oil between the guide 18 and the seal 10 which is at the same pressure as the oil in the damper tube 1, to prevent any increase in pressure at the dynamic part 10b of the seal which could cause oil to leak out.

Figure 6:
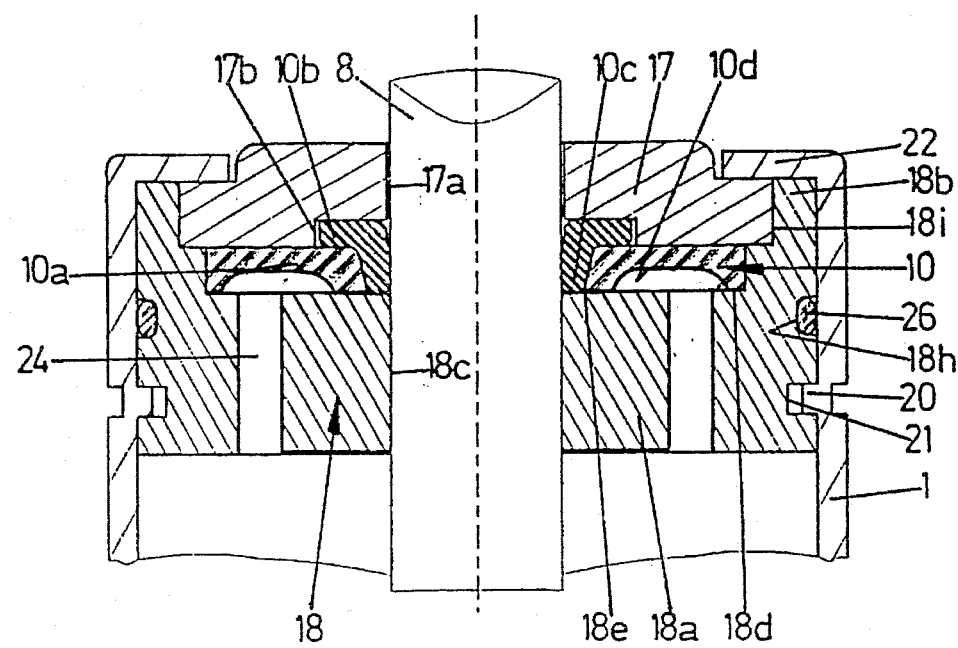
Figure 7:
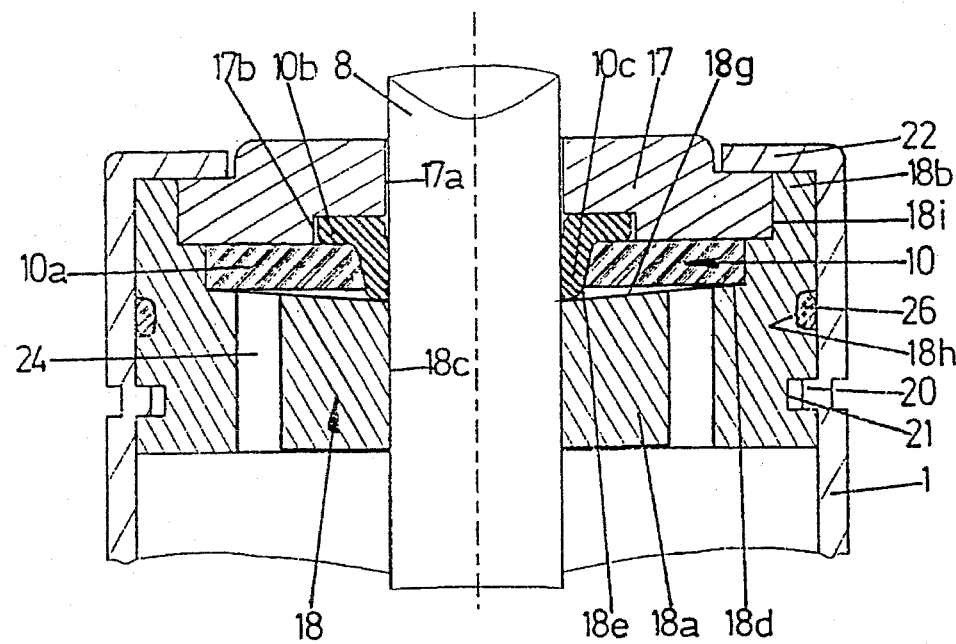

FIGS. 6 and 7 show two other embodiments of the invention providing an expansion volume for the oil. Rather than providing an annular groove 23 on the lubricated guide 18, it is possible to form the static part 10a of the seal 10 with an annular groove 10d axially facing the perforations 24 in the guide 18 (FIG. 6) or to provide a concave slightly conical surface 18g on the top of the base 18a of the guide 18 and facing the seal 10 (FIG. 6).

The piston rod 8 is usually made from hard chromium-plated steel for wear and corrosion resistance. The guide 18 can be made from sintered iron impregnated with oil, from sintered iron steam treated to harden the surface or from hard anodised aluminium.

Instead of being in one piece, the lubricated guide 18 can be in two separate parts (FIG. 4): a body 18 having a circular central bore and a tubular sleeve 18f inside the central bore of the guide body 18 providing the surface against which the piston rod rubs and by which the latter is guided. The sleeve 18f can have its inside surface coated with PTFE.

To prevent ingress of polluting particles, dust or sand into the radial clearance between the piston rod 8 and the plug 17 the obturator device of the invention preferably comprises scraper means around the piston rod 8 above the plug 17. One possible solution is to provide an annular plastics material scraper 25 fixed to the top of the plug 17 (FIG. 4), for example by means of an annular flange that is not shown. The scraper 25 has an inside circumferential lip bearing against the piston rod 8 all around it. The scraper means 25 can of course be used in the other embodiments of the invention.

To improve the seal between the guide 18 and the damper tube 1 a peripheral groove 18h can be provided around the guide to receive a rubber O-ring 26 which is compressed radially in the groove 18h by the inside wall of the tube 1.

The circular housing of the guide 18 can have a uniformly cylindrical inside peripheral surface 18i (FIGS. 2 to 4) or a cylindrical inside surface with a radial constriction at the bottom (FIGS. 5 to 7) to center the seal 10. The outside diameter of the plug 17 can be made very slightly greater than the diameter of the inside peripheral surface 18i of the guide 18 so that the plug is a force fit in the circular housing of the guide. The upper end of the tube 1 can be crimped to the plug 17 to immobilise the obturator device axially in the damper tube 1.

If the damper is often expanded, i.e. if the piston rises in the tube, or the suspension is eccentric in the upward direction, which is equivalent to being constantly at the end of the damper travel, to brake the movement of the piston it is then necessary to have a damper law varying from a few tens of dan to a few tons over a very short travel. A hydraulic brake can provide this deceleration without excessively violent impact.

In the embodiments now to be described in detail, the lower part of the guide base 18a is shaped to cooperate with a predetermined upper part of the piston as it slides. The resulting guide base and said predetermined upper part of the piston together form a hydraulic abutment.

The guide base 18a includes a skirt at the bottom into which the predetermined upper part of the piston can penetrate at least in part during its sliding movement at the end of the expansion phase. A predefined clearance with a cross-section of a few mm$^2$, typically 5 mm$^2$ to 50 mm$^2$, is provided between the inside of the skirt and the outside lateral surface of the predetermined upper part of the piston.

To reduce the load at the start of the compression phase following the expansion phase, the predetermined upper part of the piston includes at least one through-passage whose upper end can be shut off by a flexible top valve. During the expansion phase and during penetration of the predetermined part of the piston into the skirt at the bottom of the guide, the valve shuts off the through-passage; at the start of downward movement of the piston at the beginning of the compression phase the flexible valve readily opens to expose the opening at the top of the through-passage.

Figure 8:
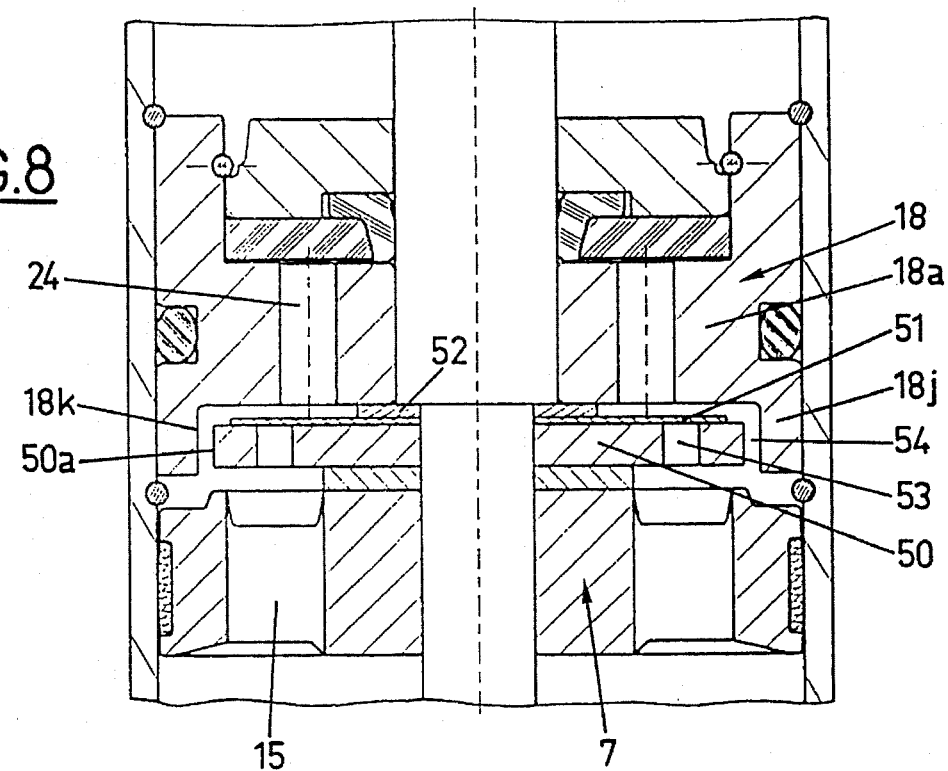

In the embodiment shown in FIG. 8 said predetermined upper part of the piston in the standard top bearing washer 50 of the piston.

The flexible valve 51 which shuts off the through-passages 53 during the expansion phase is disposed between the top surface of the bearing washer and a fixing washer 52. The cylindrical skirt 18j at the bottom of the guide base 18a is a few millimetres thick, typically 1 mm to 5 mm, and 3 mm in this example. In this embodiment the clearance 54 between the outside lateral surface 50a of the bearing washer 50 and the inside lateral surface 18k of the cylindrical skirt 18j provides the restriction to the flow of fluid procuring the hydraulic abutment effect over the last 2 mm to 5 mm travel of the piston.

Figure 9:
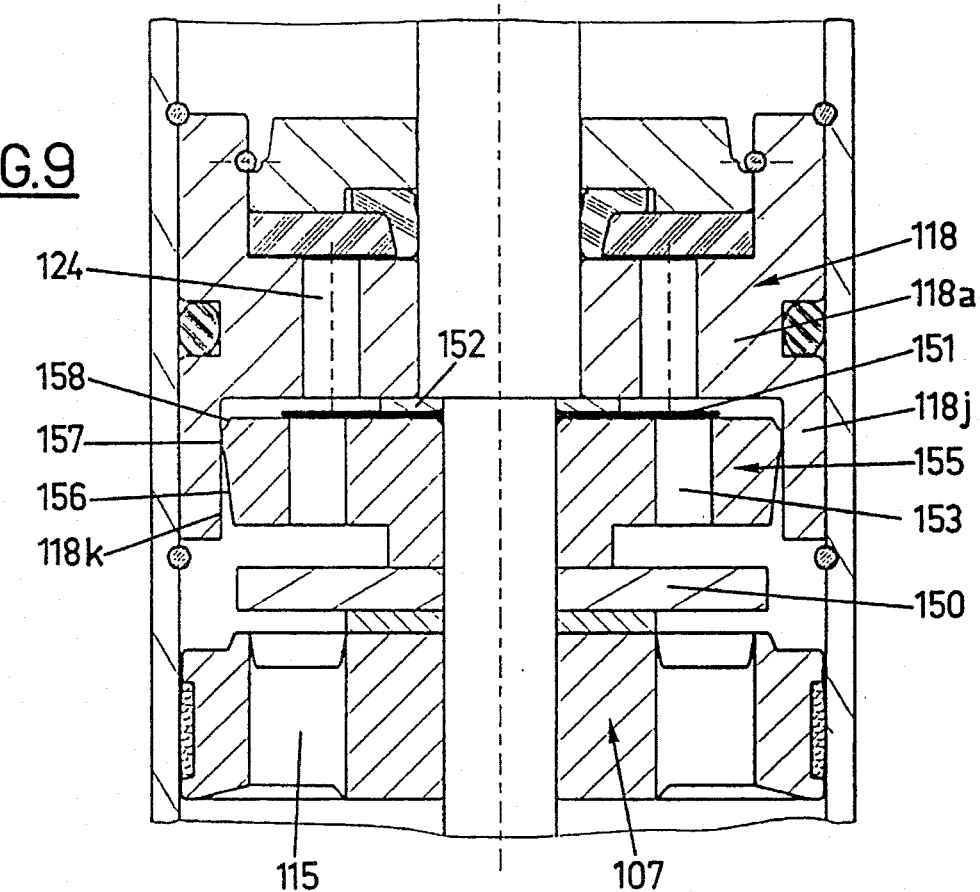
Figure 10:
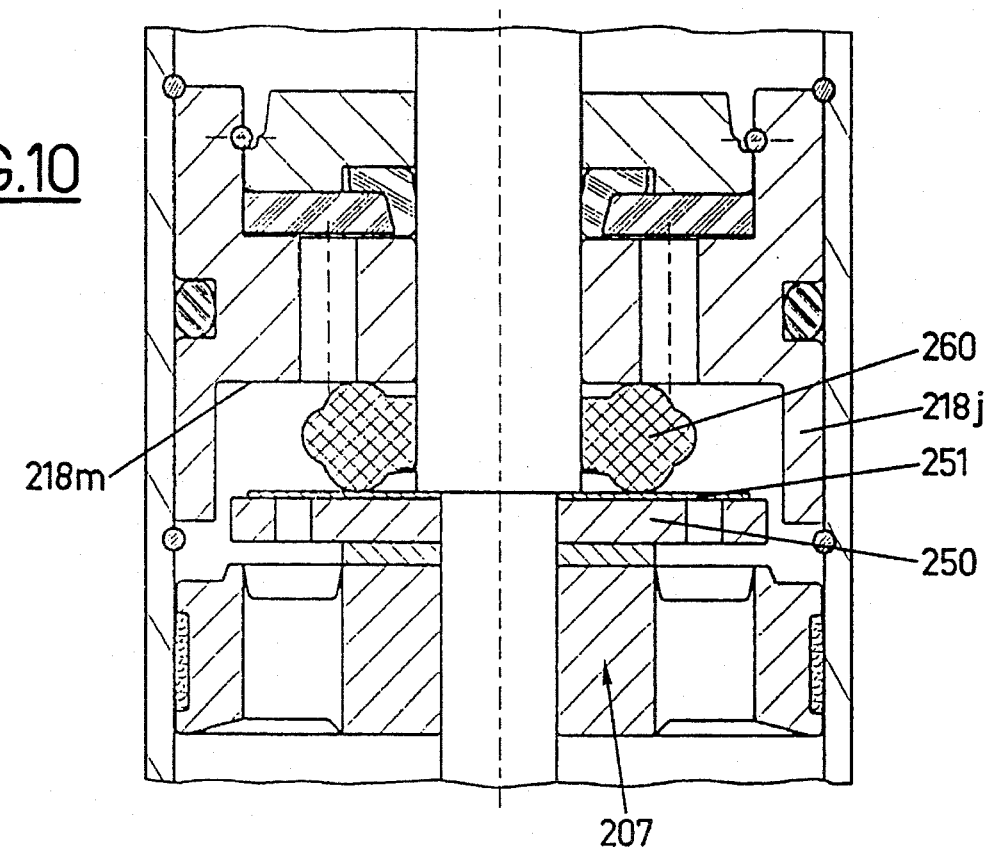
Figure 11:
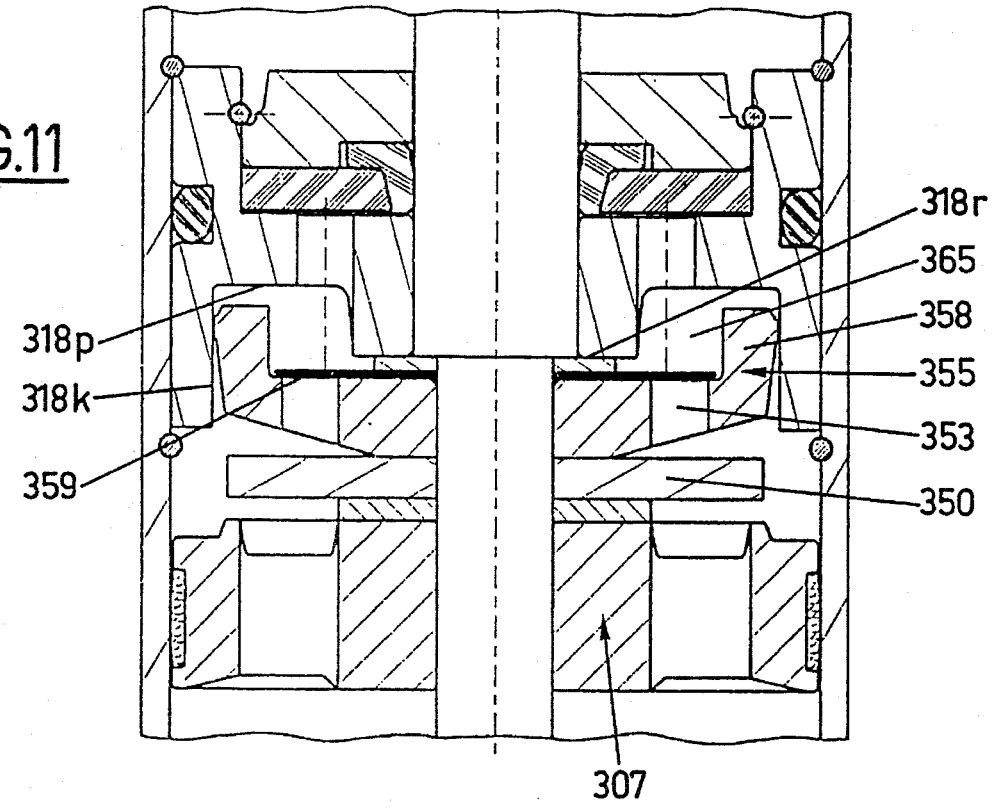

In FIGS. 9 to 11 components similar to or having functions similar to those in FIG. 8 have the same reference numbers as in FIG. 8 increased by 100, 200 and 300, respectively. Only the differences between these figures are described.

Referring to FIG. 9, the predetermined upper part of the piston 155 is here an expansion on top of the top bearing washer 150 of the piston. This expansion 155 has a cylindrical outside lateral surface 157 parallel to the cylindrical inside lateral surface 118k of the cylindrical skirt 118j at the bottom of the guide base. Although in this figure the outside cylindrical part 157 is shown as virtually in contact with the cylindrical skirt 118j, there is naturally clearance between these two surfaces to provide the hydraulic abutment effect. Also, the lateral surface 157 of the extension 155 is joined to the bottom and top surfaces of the extension 155 by respective bevels 156 and 158.

The skirt 118j is longer than the skirt 18j in FIG. 8 to provide a hydraulic abutment with travel of 5 mm to 25 mm, 15 mm in this example, with the thickness of the skirt 118j still a few millimetres.

Although the skirt 118j is shown here in the form of a cylinder with a constant inside diameter providing a non-progressive hydraulic abutment, it is possible to obtain a continually progressive abutment by providing a conical skirt 118j with a cone angle of 2° (for example) over the 15 mm of travel or a stepped progressive hydraulic abutment by providing a skirt 118j having three sections of different diameter each with a height of 5 mm.

The embodiment shown in FIG. 10 is substantially analogous to that shown in FIG. 8 in the sense that it is the standard bearing washer of the piston 250 which provides the hydraulic effect in combination with the bottom skirt 218j. However, it can be particularly advantageous in some applications to have the benefit of both types of abutment, a speed-proportional hydraulic abutment and a displacement-proportional elastic abutment. To this end an auxiliary elastic abutment member 260 made from rubber or polyurethane is fastened to the piston rod and bears against the inside surface 218m of the guide base.

In the embodiment shown in FIG. 11 the predetermined upper part of the piston contributing to the hydraulic abutment effect is also an extension 355 on top of the top bearing washer 350 of the piston 307. However, whereas in the embodiment shown in FIG. 9 the top surface of the extension 155 is plane and parallel to the plane bottom surface of the guide base, in the embodiment shown in FIG. 11 the lower surface of the guide base includes a plane central part 318r and an annular recess 318p defining with the inside surface 318k of the bottom cylindrical skirt a cavity 365.

The top surface of the extension 355 of the piston has a plane central part 359 to which is joined a projecting annular lug 358 adapted to enter at least partially into the cavity 365 during sliding of the piston at the end of the expansion phase.

This embodiment enables nesting of the piston and the guide to gain a travel of 2 mm to 8 mm, typically 5 mm, without excessive lengthening of the cylindrical skirt.

All embodiments of the invention utilise a one-piece part to provide the piston rod guide function and the hydraulic abutment function. Accurate centering of the piston by the guide and the piston rod is obtained, together with an accurate coaxial relationship between the inside diameter of the skirt and the piston rod bore of the guide.

Finally, to reduce the cost of machining the part, it is possible to sleeve, glue or weld the cylindrical skirt to a shoulder on the guide. Nevertheless, each of these two parts is then made in one piece so that assembly can be automated.

I claim:

1. An obturator device for use with a pressurised hydraulic damper tube (1) of a single-tube type in which damper tube slides a piston (7) having an axial piston rod (8), said obturator device comprising:

a plug (17), a seal (10), an expansion abutment member (11, 18) and fixing means (19 to 22) for fixing said obturator device in the tube, and said expansion abutment member comprising a cylindrical guide (18) having a guide base (18a) and an axial peripheral wall (18b) defining a circular housing for supporting and, with an interior surface of said axial peripheral wall, centering said seal and said plug, said guide base having a central opening (18c) to guide axial movement of the piston rod (8) and one or more perforations (24) to enable communication of damper fluid between an expansion volume defined by said seal and said base and an inside of the tube, and in that said plug (17) has a central opening (17a) through which the piston rod extends with said center opening having a diameter greater than a diameter of the piston rod of the tube to define a radial clearance for preventing mechanical contact between said plug and the piston rod during movement between the piston and damper tube, said plug having a circular housing (17b) around its central opening to receive part of said seal sandwiched between said plug and said cylinderical guide and said seal defining a central opening through which the piston rod extends.

2. Device according to claim 1 wherein said guide base (18a) has an annular groove (23) on an upper side of said guide base, and a plurality of perforations (24) that are arranged along a circular path and which open into a bottom of said annular groove.

3. Device according to claim 2 wherein the annular groove (23) of said guide base (18a) has a cross-section which widens in axial height in a radial interior to exterior direction.

4. Device according to claim 3 wherein said annular groove has a substantially trapezoidal cross-section.

5. Device according to claim 3 wherein said annular groove has a substantially V-shape cross-section.

6. Device according to claim 2 wherein an inside annular surface (18e) of said guide base is recessed in axial direction relative to an outside annular surface (18d) of said guide base, said annular surfaces being separated in the radial direction by the annular groove (23).

7. Device according to claim 1 wherein said guide base has a plurality of said one or more perforations that are arranged along a circular path and said seal (10) has an annular groove (10d) axially facing said perforations (24) in said guide base (18a).

8. Device according to claim 1 wherein said guide base (18a) has a concave conical surface (18g) on an upper side of said guide base and in that said seal (10) has a ring (10c) projecting axially towards said base.

9. Device according to claim 1 wherein said guide base includes two concentric ring surfaces (18d, 18e) in contact with said seal.

10. Device according to claim 1 wherein said seal (10) is made in one piece from an elastomer material.

11. Device according to claim 1 wherein said seal (10) has a static part (10a) in the form of a washer providing a sealing function between said plug (17) and an inside surface of the axial peripheral wall (18b) of said guide and a dynamic part (10b) centered relative to said static part and providing a sealing function between said plug and the piston rod (8).

12. Device according to claim 1 wherein the central opening (18c) in said guide base has a diameter that is greater than a diameter of the piston rod by an amount between a few hundredths of a millimeter and one tenth of a millimeter.

13. Device according to claim 1 wherein a diameter of the central opening (17a) of said plug is greater than a diameter of the piston rod by a few tenths of a millimeter.

14. Device according to claim 1 wherein said guide base (18a) has a central bore in which is mounted a tubular guide sleeve (18f).

15. Device according to claim 1 further comprising a scraper means (25) supported by said plug and protecting a radial clearance formed between said plug and the piston rod from the external environment.

16. Device according to claim 1 wherein said plug (17) is forcibly sleeved into the circular housing of said guide (18).

17. Device as defined in claim 1 wherein a lower part of said guide base (18a) is shaped to cooperate with a predetermined upper part of the piston as the piston slides, said guide base thus being shaped to form a hydraulic abutment upon the upper part of the piston cooperating with said guide base.

18. Device according to claim 17 wherein said guide base (18a) includes a skirt (18j) at a bottom thereof which skirt is dimensioned such that the predetermined upper part of the piston can penetrate at least partially into the skirt as the piston slides in the damper tube and such that a predefined clearance (54) is provided between the inside surface of said skirt and an outside lateral surface of the predetermined upper part of the piston.

19. Device according to claim 1, wherein both said seal and plug are axially fixed in place within said circular housing with a fastening device that contacts the interior surface of said axial peripheral wall.

20. Device according to claim 19 wherein said fastener device is a circlip received by a groove formed in the interior surface of said axial peripheral wall.

21. Device according to claim 1 wherein said plug and seal are entirely received with the confines of the circular housing defined by said peripheral wall.

22. A damper tube assembly, comprising a damper tube of a single tube type;

a piston slideably positioned within said damper tube, and said piston including an axial piston rod;

an obturator device positioned within said damper tube, said obturator device comprising:

a plug, a seal, an expansion abutment member, and a fixing device which fixes said obturator device in the tube, and said expansion abutment member comprising a cylindrical guide having a guide base and an axial peripheral wall defining a circular housing for supporting and centering said seal and said plug, said guide base having a central opening to guide axial movement of said piston rod and one or more perforations to enable communication of damper fluid between an expansion volume defined by said seal and said base and an inside of said damper tube, and in that said plug has a central opening through which said piston rod extends with said central opening having a diameter greater than a diameter of said piston rod to define a radial clearance for preventing mechanical contact between said plug and said piston rod during operation of said damper tube assembly, said plug having a circular housing around its central opening to receive part of said seal sandwiched between said plug and said guide device, and said seal having a central opening through which said piston rod extends, and wherein a lower part of said guide base of the obturator device is shaped to cooperate with a predetermined upper part of said piston as said piston slides within said damper tube, said guide base and said predetermined upper part thus being together formed to provide a hydraulic abutment upon the predetermined upper part cooperating with said guide base.

23. A damper tube assembly as recited in claim 22 wherein said guide base includes a skirt at a bottom thereof, which skirt is dimensioned such that the predetermined upper part of the piston can penetrate at least partially as the piston slides in the damper tube and such that a predefined clearance is provided between the inside surface of said skirt and an outside lateral surface of the predetermined upper part of the piston and in that the determined upper part of the piston includes a flexible top valve and at least one through-passage having a top opening closeable by said flexible top valve.

24. A damper tube assembly according to claim 23 wherein said predetermined upper part of the piston is an upper bearing washer of the piston.

25. A damper tube assembly according to claim 23 wherein the predetermined upper part of said piston comprises a supplementary extension positioned on top of an upper bearing washer of the piston, said extension having a cylindrical outside lateral surface parallel to the cylindrical inside lateral surface of said skirt positioned at the bottom of said guide base.

26. A damper tube assembly according to claim 25 characterised in that an upper side of the extension is planar and is parallel to a planar lower side of said guide base.

27. A damper tube assembly according to claim 25 characterised in that a lower side of the guide base includes a planar central part and an annular recess defining, with the inside surface of the skirt, a cavity and in that an upper side of the extension of the piston includes a planar central part which merges with a projecting annular lug of said extension which lug is adapted to penetrate at least partially into said cavity during sliding of the piston.

28. A damper tube assembly according to claim 23 characterised in that the bottom skirt is in one piece with said guide base or is attached to said guide base.

29. A damper tube assembly according to claim 22 characterised in that it further includes an auxiliary elastic abutment member disposed between the predetermined upper part of the piston and the lower side of the guide base.

30. A damper tube assembly, comprising a damper tube of a single tube type;

a piston slideably positioned within said damper tube, and said piston including an axial piston rod;

an obturator device positioned within said damper tube, said obturator device comprising:

a plug, a seal, an expansion abutment member, and a fixing device which fixes said obturator device in the tube, and said expansion abutment member comprising a cylindrical guide having a guide base and an axial peripheral wall defining a circular housing for supporting and, with an interior surface of said axial peripheral wall, centering said seal and said plug, said guide base having a central opening to guide axial movement of said piston rod and one or more perforations to enable communication of damper fluid between an expansion volume defined by said seal and said base and an inside of said damper tube, and in that said plug has a central opening through which said piston rod extends with said central opening having a diameter greater than a diameter of said piston rod to define a radial clearance for preventing mechanical contact between said plug and said piston rod during operation of said damper tube assembly, said plug having a circular housing around its central opening to receive part of said seal sandwiched between said plug and said guide cylinderical, and said seal having a central opening through which said piston rod extends, and wherein a lower part of said guide base of the obturator device is shaped to cooperate with a predetermined upper part of said piston as said piston slides within said damper tube, said guide base and said predetermined upper part thus being together formed to provide a hydraulic abutment upon the predetermined upper part cooperating with said guide base.

31. An obturator device for use with a pressurised hydraulic damper tube (1) in which damper tube slides a piston (7) having an axial piston rod (8), said obturator device comprising:

a plug (17), a seal (10), an expansion abutment member (11, 18) and fixing means (19 to 22) for fixing said obturator device in the tube, and said expansion abutment member comprising a cylindrical guide (18) having a guide base (18a) and an axial peripheral wall (18b) defining a circular housing for supporting and centering side seal and said plug, said guide base having a central opening (18c) to guide axial movement of the piston rod (8) and one or more perforations (24) to enable communication of damper fluid between an expansion volume defined by said seal and said base and an inside of the tube, and in that said plug (17) has a central opening (17a) through which the piston rod extends with said center opening having a diameter greater than a diameter of the piston rod of the tube to define a radial clearance for preventing mechanical contact between said plug and the piston rod during operation of the damper tube, said plug having a circular housing (17b) around its central opening to receive part of said seal sandwiched between said plug and said cylinderical guide and said seal defining a central opening through which the piston rod extends and wherein said plug is forcibly sleeved into the circular housing of said guide.

* * * * *